United States Patent
Link, II et al.

(10) Patent No.: US 11,285,915 B2
(45) Date of Patent: Mar. 29, 2022

(54) METHOD AND SYSTEM FOR USING A WIRELESS MOBILE DEVICE AS A SMART KEY

(71) Applicant: M2MD Technologies, Inc., Atlanta, GA (US)

(72) Inventors: Charles M. Link, II, Atlanta, GA (US); Austin Ross, Cumberland, RI (US)

(73) Assignee: M2MD TECHNOLOGIES, INC., Atlanta, GA (US)

( * ) Notice: Subject to any disclaimer, the term of this patent is extended or adjusted under 35 U.S.C. 154(b) by 564 days.

(21) Appl. No.: 15/672,972

(22) Filed: Aug. 9, 2017

(65) Prior Publication Data
US 2019/0047511 A1 Feb. 14, 2019

(51) Int. Cl.
*B60R 25/24* (2013.01)
*G07C 9/00* (2020.01)
*G07C 9/28* (2020.01)

(52) U.S. Cl.
CPC .......... *B60R 25/24* (2013.01); *G07C 9/00309* (2013.01); *G07C 9/28* (2020.01); *B60R 2325/108* (2013.01); *B60R 2325/205* (2013.01); *G07C 2009/00412* (2013.01); *G07C 2009/00769* (2013.01); *G07C 2209/08* (2013.01)

(58) Field of Classification Search
CPC .................................................... B60R 25/24
See application file for complete search history.

(56) References Cited

U.S. PATENT DOCUMENTS

| | | | | |
|---|---|---|---|---|
| 4,222,034 A | * | 9/1980 | Orenzow | B60R 25/04 180/287 |
| 5,774,043 A | * | 6/1998 | Mizuno | B60R 25/00 307/10.2 |
| 6,535,116 B1 | * | 3/2003 | Zhou | B60C 23/009 340/438 |
| 7,350,083 B2 | * | 3/2008 | Wells | G06F 21/72 380/46 |
| 8,907,763 B2 | * | 12/2014 | Pineau | H04W 4/90 340/5.61 |
| 8,941,465 B2 | * | 1/2015 | Pineau | G06F 21/32 340/5.2 |

(Continued)

*Primary Examiner* — K. Wong
(74) *Attorney, Agent, or Firm* — Doughty Law, L.L.C.; John Doughty

(57) ABSTRACT

A computer device associated with a vehicle pairs during an initial/setup pairing process with a UE device according to a wireless protocol. The devices exchange and store cryptographic information during pairing. Later, either device may detect/discover that the other is currently in its presence. Presence discovery may trigger the vehicle device to generate and broadcast an operational request message based on the cryptographic information, such as a public key of the UE, stored in the vehicle device. The UE receives the request, and transmits in response a vehicle operation permission message that it generates based on user input and cryptographic information, such as a public key of the vehicle device, stored by the UE during initial/setup pairing. The operational request message may be transmitted as an audio signal and received by a microphone of the UE. The vehicle device receives the permission message and generates an operation instruction based thereon.

19 Claims, 5 Drawing Sheets

(56) References Cited

U.S. PATENT DOCUMENTS

| | | | |
|---|---|---|---|
| 9,311,639 B2* | 4/2016 | Filler | G06Q 20/367 |
| 9,342,674 B2* | 5/2016 | Abdallah | G06F 21/32 |
| 9,608,970 B1* | 3/2017 | Gehret | H04L 63/062 |
| 9,847,007 B2* | 12/2017 | Logan | G08B 21/0446 |
| 9,997,036 B2* | 6/2018 | Scalisi | H04N 5/2257 |
| 10,034,146 B2* | 7/2018 | Chuang | H04W 76/10 |
| 10,081,334 B1* | 9/2018 | Chen | B60R 25/241 |
| 2015/0102906 A1* | 4/2015 | Gerhardt | G07C 9/00309 |
| | | | 340/5.61 |

* cited by examiner

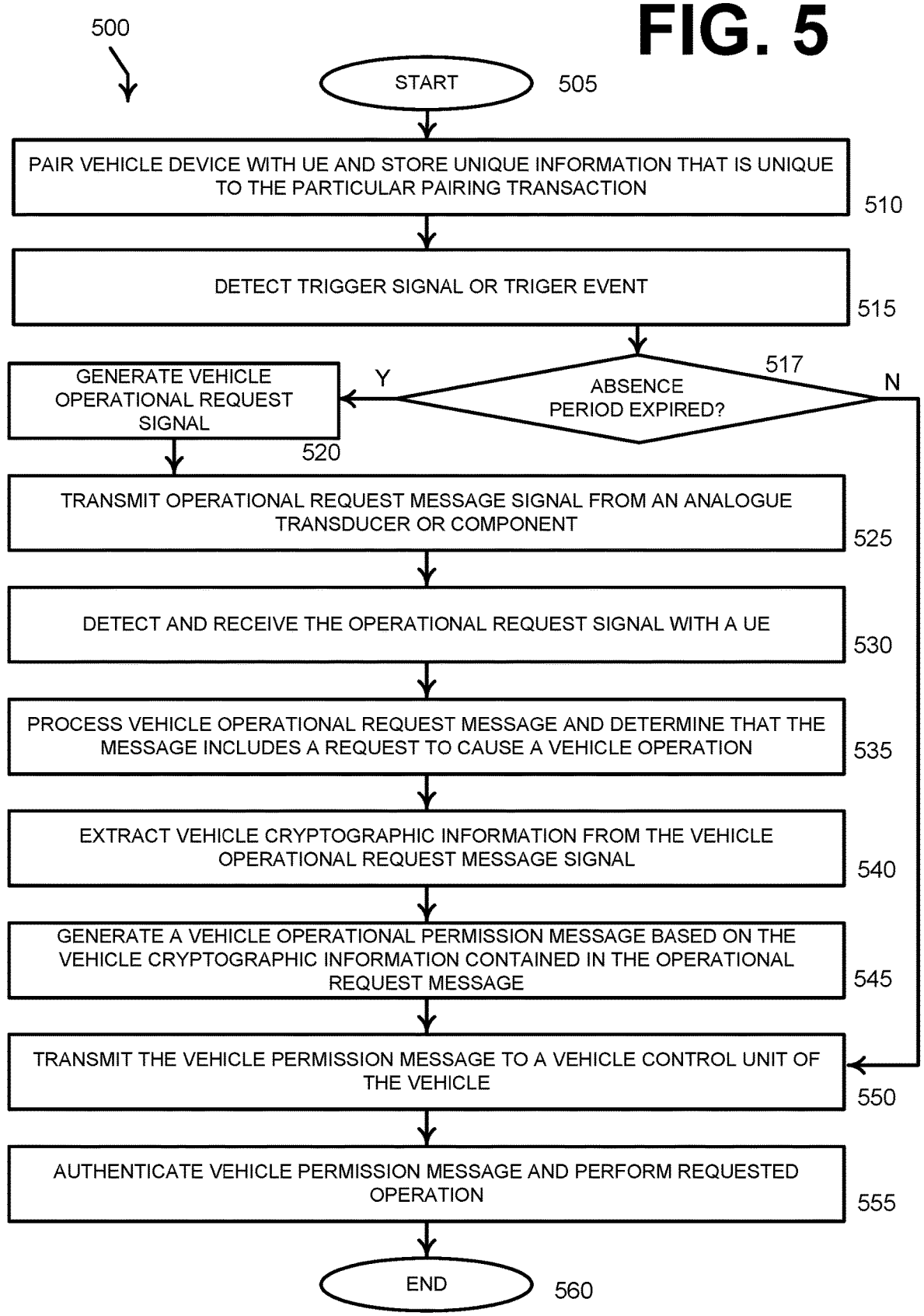

METHOD AND SYSTEM FOR USING A WIRELESS MOBILE DEVICE AS A SMART KEY

FIELD

The field relates, generally, to wirelessly performing vehicle, or machine, operations, such as unlocking and starting, dispensing of a product, transmitting of data, and the like.

SUMMARY

Smart phones, tablets, laptops, and other similar mobile computers have come into almost ubiquitous use with consumers, as well as with professional vehicle operators and equipment service personnel, and more and more equipment, such as, vehicles, vending machines, coin-operated machines, currency-operated machines, credit/debit-card-operated machines, and smart-phone-operated machines can be wirelessly controlled, wirelessly operated, and wirelessly receive payment for products associated therewith from the mobile computer devices. Vehicles, and other machines may be operated wirelessly from a user device ("UE") (typically a smart phone, but a UE may also be a tablet, a laptop computer, a smart-watch, a wearable device, or other similar wireless mobile device that can communicate via a wireless network, such as a cellular telephony/mobile data network, a Wi-Fi network, or via a short range wireless link, such as Bluetooth or near field communication ("NFC")) through interaction between the UE and a wireless mobile device connected with the vehicle, or other machine. For purposes of simplicity and clarity, description herein will primarily be in reference to a vehicle as the wirelessly controllable device that may be controlled by a UE, but concepts disclosed herein may also apply to wirelessly controllable/interactive machines such as vending machines, sales kiosks (such as may be operated by business operators such as restaurants and airlines for taking orders and ticketing, respectively), drones, audio/video entertainment device, gaming device, or the like.

In the vehicle context, a vehicle typically includes a communication bus, which may be a controller area network ("CAN") bus or similar, that connects various sensors (e.g., engine-related, transmission-related, steering, braking, acceleration, and other sensors that detect vehicle operational information), and that provides the operational information from the sensors to a central vehicle computer, such as an engine control module ("ECM"). The vehicle may also include a plurality of operational modules that connect to the communication bus, which modules may include a starting system module, door lock/unlock actuators and related circuitry, window motors and associated circuitry, heating/ventilating, and air conditioning ("HVAC") equipment and associated circuitry, navigation system, infotainment system, and the like. The modules may receive instructions from the ECM to perform such actions as unlocking the vehicle's doors, operating one or more windows, starting the vehicle (i.e., cranking the engine or enabling operation of an electric vehicle's propulsion system), operating the HVAC system, and the like. The ECM may generate messages that cause operation of various modules and may provide the operational message to the vehicle's CAN bus or similar. The operational messages may be generated in response to a user's interaction with the vehicle (i.e., operating a key in a lock of the vehicle, entering a code with a push button pad or touch screen, providing a voice command, or the like).

Or, the ECM may receive messages from an external source, such as a vehicle telematics module, which may be referred to as a telematics control unit ("TCU"). The TCU, which is typically located in the vehicle and is typically connected to the CAN communication bus, may receive operational/control information messages wirelessly via a long-range wireless communication network, such as a wireless mobile network (i.e., a wireless cellular/data network that may support LTE, CDMA, GSM technologies, or the like). The TCU may receive operational/control information messages that a telematics services provider generates at an internet-connected telematics services provider's network server, which may be referred to as a telematics operations server ("TOS"). (A TOS may be operated in connection with a telematics operation center ("TOC"), such as a call center, which may be staffed with personnel, or an unstaffed computer system that operates automatically.) The TCU may receive operation/control messages that a user may generate with his, or her, smart phone, or other mobile computing device. A TCU may also report vehicle condition information to a UE or to a TOS/TOC over a long-range wireless link.

Instead of using a traditional physical key in a lock to unlock a vehicle's doors, trunk, hood, etc., and to start the vehicle, a user may use an application running on his, or her, smart phone, to cause such actions to occur. For example, a user may use a smart phone application to remotely open a car's windows on a hot day or to unlock the doors to the car. A user may also remotely start his, or her, car from afar using a smart phone application. Such action may be performed securely via a long-range wireless network link where a user's door unlock command or vehicle start command may travel via a long range wireless communication network from the user's smart phone, to a TOC, and back to the vehicle. Such a process is fairly secure, but may not complete until a long period has elapsed due to round trip latency in the communication network and due to computer processing at the TOC.

Using short range wireless links, such as Bluetooth or similar technologies that may provide short range wireless two-way communication between devices, a smart phone application may provide a vehicle unlock or vehicle start command that may be implemented much more quickly than can occur using the long-range-wireless round trip method with the TOC. However, because class 2 Bluetooth signals typically have an operational range of approximately thirty meters, and class 1 Bluetooth transmission signals may extend up to about 100 meters, an unauthorized user that is not the user of the smart phone application who is attempting to start the vehicle (i.e., a vehicle's owner or authorized operator) may intercept a Bluetooth signal that is meant to start a car, or that is meant to unlock the car's doors. This scenario may occur when the user of the smart phone application who is attempting to start the vehicle is not proximate, or inside of, the car and may not have a direct line of sight of the car when attempting to open it, or start it, remotely. If the wireless device of a third party that is present near the vehicle intercepts the Bluetooth command to open or to start the vehicle, that third party may be able to extract and store authentication information that was legitimately transmitted in the Bluetooth signal by the vehicle owner's smart phone application. After obtaining the authentication information, unbeknownst to the vehicle's owner, the nefarious third party user may be able to generate a non-authorized command to operate the vehicle to, among other things, open the vehicle or even start it and steal it.

To preclude a nefarious third party from intercepting a wireless signal sent from a legitimate user's smart phone application, a vehicle and UE application associated with the vehicle may be configured to only allow certain operations, such as door unlock or vehicle start, to be performed wirelessly if an authorized UE is located either inside a cabin of the vehicle, or proximate the vehicle within a shorter range than wireless links such as Bluetooth can support.

To facilitate wireless operations with an authorized UE that is only within, or very close to, a cabin of the vehicle, the ECU, or TCU, of the vehicle may be configured to only permit certain operations of the vehicle if certain aspects of the authenticating of the UE application with the vehicle device occur using speakers of an audio system of the vehicle and a microphone of the UE.

In an aspect, instead of using, or instead of only using, speakers of the vehicle and microphone of a UE to perform certain aspects of the authenticating of the UE application with the vehicle device, vehicle operational request messaging and vehicle operation permission messaging may be conducted via an infrared link.

In an aspect, the ECU, or TCU, may determine that a UE is within, or very close to, the cabin of the vehicle, by evaluating a signal strength of a short range wireless signal of the UE.

In an aspect, to improve an approximation that may be generated by evaluating the received signal strength indication ("RSSI") of a UE's BTLE beacon/proximity signal, a refined-calibration distance may be determined based on the RSSI of the received beacon signal and based on a previously performed in-situ calibration method performed in or near the vehicle, or near the machine device to be operated, preferably during a pairing process where cryptographic information is exchanged between the UE and ECU or TCU of the vehicle.

In an aspect, the vehicle operational request message may only indicate that the UE may perform any operation that a user interface of the UE is capable of giving permission for, and that the vehicle is configured to perform. For example, upon detecting presence of a UE, the vehicle computer device control unit may transmit a signal via its speaker that a UE it has been paired with may request any operation that the UE and vehicle have been preconfigured to perform in cooperation with each other. Thus, a vehicle may be capable of performing certain operations, but software of the UE may not be configured to grant permission for the same operation, and thus although the vehicle operational request message may trigger a user interface of a UE to wait for user input, the user interface may not present an option to operate all features or capabilities of the vehicle. An example might be that a given UE is only configured to unlock doors to the vehicle but not start the vehicle.

In an aspect, a method comprises the steps of receiving a vehicle operational request message signal generated by a computer device of a vehicle, such as an ECM or a TCU that may communicate with a telematics services provider's back end central computer system and server(s). Examples of telematics services and corresponding providers include OnStar® offered by General Motors Company and Mbrace® offered by Mercedes Benz (which service is provided by Verizon Telematics Inc.). The method processes the vehicle operational request message signal, determines from the processing of the vehicle operational request message signal that the vehicle operational request signal includes a request to operate the vehicle, extracts vehicle cryptographic information, or one-time-use information that may include information for use by a cryptographic algorithm, from the vehicle operational request message signal, generate a vehicle operation permission message based on the vehicle one-time-use, or cryptographic, information, and transmits the vehicle operation permission message as a vehicle operation permission message signal. In an aspect, the computer device of the vehicle may generate the vehicle operational request message signal in response to detection of a trigger signal. The trigger signal may be a proximity signal generated by a user device. The trigger signal may be generated in response to a user operating a brake pedal, a lock, a switch, or other vehicle component. In an aspect, the steps of the method may be performed by a wireless user device; the wireless user device may a smart phone, a tablet, a laptop, a wearable device, or other devices that can communicate wirelessly with other devices, either via a long range wireless mobile communication network, or just via a short range wireless protocol link, such as Wi-Fi, Bluetooth, NFC, or similar.

In an aspect, the process of pairing a UE and a computer device of a vehicle, such as a TCU or ECU, may include a user manually pushing a button, or buttons, of one or more buttons of one or more wireless vehicle operational devices associated with the vehicle. Examples of vehicle operational devices include key FOBs. Typically, two key FOBs are associated with a vehicle during manufacture of the vehicle and accompany the vehicle when it is sold. Vehicle key FOBs typically contain vehicle cryptographic information that is associated with the vehicle control unit of the vehicle with which the FOBs are associated. An example of vehicle cryptographic information that may be stored in a UE during pairing may include a public key of the vehicle or of a vehicle control unit of the vehicle. During pairing, vehicle cryptographic information may be provided to the UE from one or more FOBs directly, or from the vehicle control unit. In an aspect disclosed herein, during the pairing process of a smart phone, or other UE device, with a control unit of a vehicle, not only does the UE store cryptographic information of the vehicle control unit, the UE may also store cryptographic information of one or more key FOBs that are already associated with the control unit of the vehicle. The vehicle control unit may confirm by receiving cryptographic information transmitted by manipulation of the one or more key FOBs during the pairing process that the UE it is pairing with is likely controlled by someone who owns, or who is authorized by someone who owns, the vehicle. After pairing of the UE with the vehicle control unit, the UE may generate a permission message in response to a request message it receives, perhaps as an audio signal or as a QR/bar code, based on cryptographic information associated with the vehicle control unit or based on the cryptographic information of one or more of one or more FOBs that were manipulated during pairing of the UE with the vehicle control unit.

In an aspect, the vehicle operational request signal is an audio signal; the audio signal may be received from the vehicle via a microphone, or similar analogue transducer of the user device. In an aspect, the audio signal includes tones, or tone components, within an ultrasonic range. In an aspect, the audio signal may comprise an FSK signal, an audio FSK signal ("AFSK"), PSK signal, or an audio PSK signal, discrete multitone ("DMT") or may comprise information modulated according to another modulation scheme for transmitting digital data.

The cryptographic information may be based on secret information shared between a user device and the computer device of the vehicle during a wireless protocol pairing operation that occurred before some of, or all of, the previously described steps. In an aspect the wireless protocol is Bluetooth Low Energy. In an aspect, the vehicle operational request message may include or be included in, a signal for forwarding to a display for generating a corresponding QR code image, a bar code image, or the like.

In an aspect, a method running on a computer device causes a vehicle computer device, which may be a vehicle control unit, to determine that a UE is currently present in a vehicle that is associated with the vehicle computer device. The method may be running on the vehicle computer device, or may be running on a different computer device associated with the vehicle to cause the vehicle computer device/vehicle control unit, to perform the steps of the aspect method. The vehicle computer device generates a vehicle operational request message with a computer device of the vehicle, transmits the vehicle operational request message generated as a vehicle operational request message signal, receives a vehicle operation permission message, determines that the received vehicle operation permission message was generated based on vehicle cryptographic information shared during a pairing of a vehicle computer device with the UE before the current presence of the UE in the vehicle was detected, and generates an instruction to perform a vehicle operation included in the received vehicle operation permission message. The instruction may be forwarded to an ECU, or other module of the vehicle, and may include one or more of: a door unlock instruction, a trunk unlock instruction, a vehicle start instruction, or an HVAC operation instruction, or other vehicle operation.

In an aspect, the vehicle operational request signal is an audio signal. In an aspect the audio signal is transmitted from the vehicle via a speaker, which may be a speaker that is part of the vehicle, or may be a speaker that is part of a device that is coupled, either by a wired or by a wireless link, with the vehicle or vehicle computer device.

In an aspect, a vehicle computer device determines the current presence of a UE in a vehicle, receives a vehicle operation permission message, determines that the received vehicle operation permission message was generated based on vehicle cryptographic information shared during a pairing of a vehicle computer device with the UE before the current presence of the UE in the vehicle was detected, determines that the received vehicle operation permission message is the same as a previously received vehicle operation permission message, determines that the received vehicle operation permission message that is the same as the previously received vehicle operation permission message was received within an absence period, and generates an instruction to perform a vehicle operation included in the received vehicle operation permission message. In an aspect the absence period is configurable by a user interface of a UE, which was paired with the vehicle computer device before the previously received vehicle, operation permission message was received.

BRIEF DESCRIPTION OF THE DRAWINGS

FIG. 5 illustrates a flow diagram of a method for granting permission to perform one or more vehicle operations via a user equipment device.

DETAILED DESCRIPTION

As a preliminary matter, it will be readily understood by those persons skilled in the art that aspects described herein are susceptible of broad utility and application. Many methods, embodiments, and adaptations other than those herein described as well as many variations, modifications and equivalent arrangements, will be apparent from or reasonably suggested by the substance or scope of the aspects described herein.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise exclude any such other embodiments, adaptations, variations, modifications and equivalent arrangements, the present invention being limited only by the claims appended hereto and the equivalents thereof.

Figure 1:
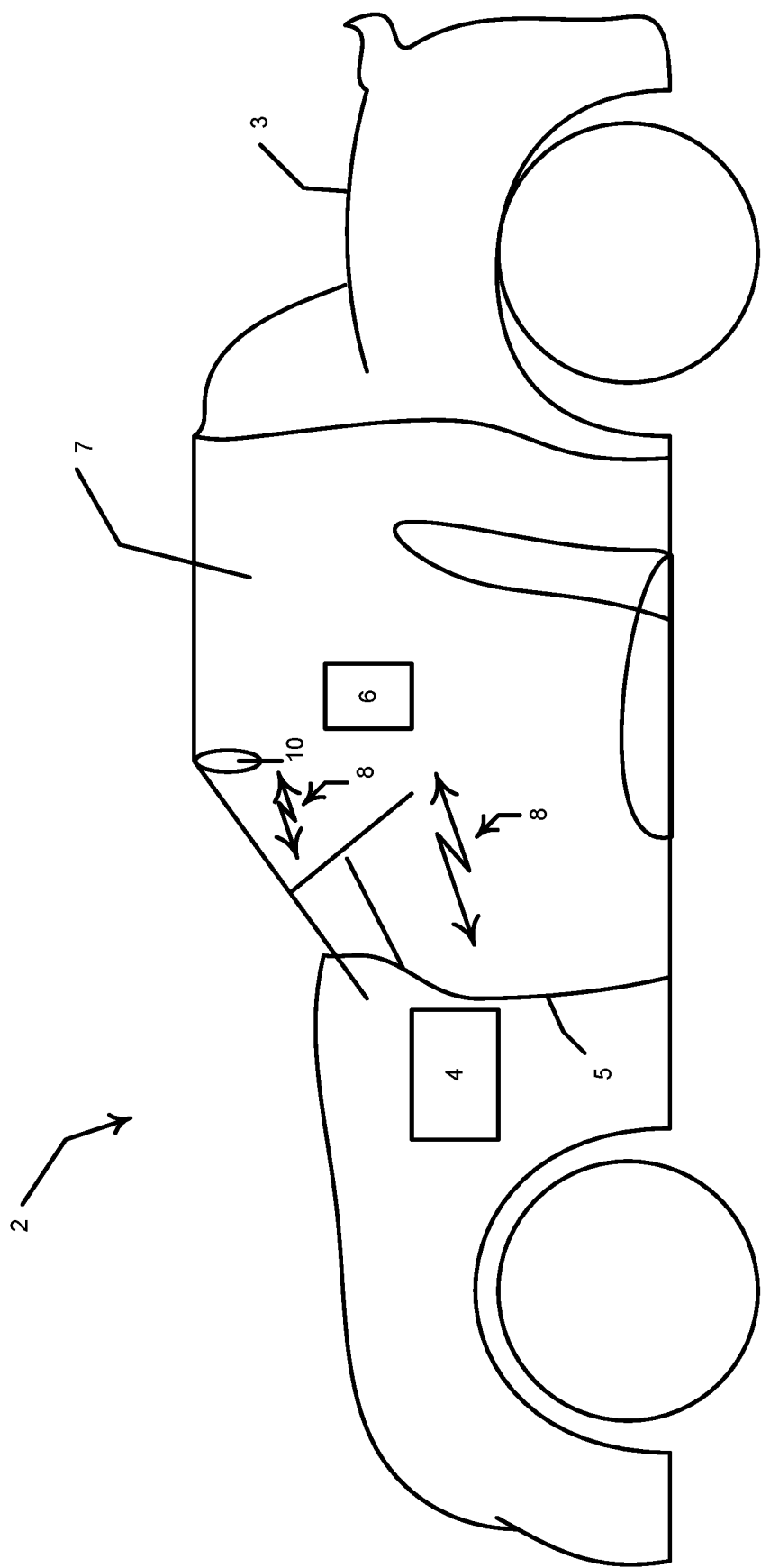
FIG. 1 illustrates a vehicle environment and devices for pairing.

Turning now to the figures. FIG. 1 illustrates a vehicle environment 2 that includes vehicle 3. Vehicle 3 is shown with control unit 4, which may include a TCU or an ECU, located on the engine-compartment-side of firewall 5. Control unit 4 may include an ECM, and may include TCU circuitry that may be used to facilitate telematics services, such as for example, automatic crash notification, remote door unlock, remote vehicle start, remote vehicle stop, etc. The TCU may be configured for acquiring diagnostic information from a vehicle communication bus from an ECM (if the ECM is coupled to the communication bus but is not part of control unit 4) and providing the diagnostic information wirelessly over a long-range wireless communication network (such as a cellular wireless mobile network, including 2G, 3G, 4G, 5G, CDMA, GSM, LTE, and the like), to a remote telematics services provider's server. The TCU circuitry may also be configured for receiving and processing wireless signals that may include operation requests signals from the long-range wireless communication network. The TCU may also be configured for transmitting and receiving signals and messages via a short range wireless communication link to a proximate device, such as user equipment device 6 located within cockpit 7 of vehicle 3, which UE may be a user's smart phone, tablet, laptop computer, etc. that is within a range of the TCU and which range corresponds to the type of short range wireless link, which may include Bluetooth, Bluetooth Low Energy, Wi-Fi, or other short-range IEEE 802.11 wireless link protocols, or similar.

It will be appreciated that control unit 4 may be installed into vehicle 3 and connected to the vehicle's communication bus at the time of manufacture of the vehicle, or the control unit may be an aftermarket item that is installed by a dealer, owner, driver, or other user of vehicle after the manufacture of the vehicle. (A typical aftermarket TCU device is plugged into, or coupled with, a vehicle diagnostic port, such as an OBD-II diagnostic port.) In addition, it will be appreciated that control unit 4 may be installed on the cockpit-side of firewall 5 inside cockpit 7. Vehicle 3 is shown with short-range wireless link 8 in communication with control unit 4 and in communication with an antenna and receiver (which may connect with control unit 4 via a wired, or wireless, link) mounted to visor 10 of the vehicle. Typically, UE 6 communicates with control unit 4 over a single wireless link 8; if, for example, the UE is wirelessly coupled with a receiver mounted to visor 10, which may have a separate link to control unit 4, the UE may not establish a wireless link directly with the control unit. Alternatively, if the receiver mounted to the visor only provides access to a vehicle speaker, or speakers, and to a vehicle microphone, or microphones, via a wireless link, then UE 6 would typically also establish a wireless link to control unit 4 via a separate wireless link 8 to transmit and receive data, to, and from, the control unit, respectively.

A user of UE 6 may perform a pairing operation to associate the UE with control unit 4 to facilitate, among other things, hands-free calling/talking, which may utilize a microphone, or microphones, of vehicle 3, and a speaker, or speakers, of the vehicle, which may be permanently installed in the vehicle, but which may be included in an aftermarket device that may be clipped, adhered to, plugged into, or otherwise, mounted in cockpit 7 of the vehicle. In FIG. 1, UE 6 is shown inside cockpit 7 in close proximity to control unit 4 and within audio range of speakers that may be installed in the cockpit, either permanently at the time vehicle 3 was manufactured (typically as part of an audio or infotainment system of the vehicle), or in a device that may be installed aftermarket, such as in a Bluetooth device that may be clipped to visor 10. When paired with control unit 4, UE 6 may be configured to provide control messages to the ECM, or other vehicle control modules (e.g., a TCU, an infotainment head unit, a video controller or display, an audio head unit, an HVAC system module, door lock actuators, window controllers and actuators, trunk opening actuators, an engine start controller, etc.), via a data link 8.

Figure 2:
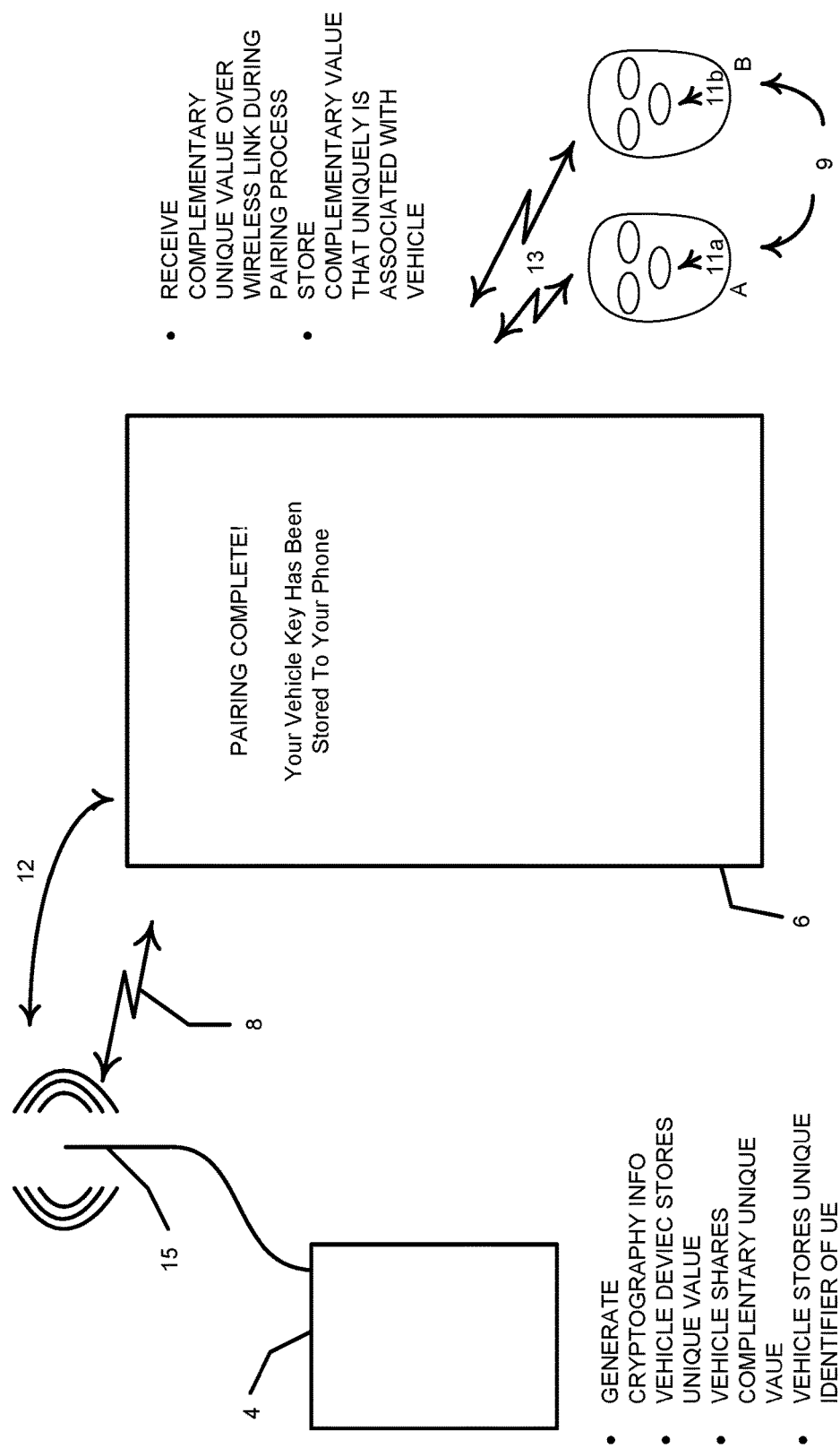
FIG. 2 illustrates two devices being paired for use in a vehicle environment.

Turning now to FIG. 2, a pairing process between a vehicle control unit 4 and a UE 6 is illustrated. UE 6 and vehicle control unit 4 establish data link 8. Antenna 15 of control unit 4 is shown to indicate that the antenna may be in the vehicle remote from, or physically separate from, control unit 4. It will be appreciated that antenna 15 may be included as part of control unit 4 instead of connected to the control unit via a physical link such as a wire.

UE 6 and control unit 4 may begin pairing process 12 upon UE becoming proximate the control unit. For example, if both UE 6 and vehicle control unit 4 have been set (typically by a user such as a driver, owner, vehicle seller, or vehicle manufacturer) to detect another device according to a short range wireless protocol, such as, for example, Bluetooth, the two devices may begin setting up the pairing process that will facilitate transmitting and receiving data between themselves by generating cryptographic material, or cryptographic information. The pairing process may include vehicle control unit 4 generating cryptographic information, such as a private key and complementary public key or a single symmetric pre-shared key. Vehicle control unit 4 may store a private key and share a corresponding public key with the device it is pairing with during pairing process 12, which device in the present scenario is UE 6. Vehicle control unit 4 may also receive and store a unique identifier and public key of UE 6 after it performs a similar cryptographic process to generate unique private and public key that are unique to the UE. Similar steps occur at UE 6 in storing the unique identifier and the associated public key of vehicle control unit 4. After devices 4 and 6 have paired with each other, either, or both, may display or otherwise provide a message via an audio or video display that the devices have been paired. In an aspect, the pairing process may include the manipulation of one or more vehicle operational devices 9, which may be key FOBs that have been associated with vehicle 2, or control unit 4 corresponding thereto. Pressing one or more of buttons 11a or 11b, corresponding to FOBs 9A and 9B, respectively, during the process of pairing UE 6 with control unit 4 provides conformation to vehicle control unit 4 that the UE is being paired by an authorized user of vehicle 2 that is associated with the control unit. In addition, vehicle cryptographic information stored within one or more of FOBs 9 may be stored into UE 6 for future use as described below. Vehicle cryptographic information stored in FOBs 9 may be transmitted via short-range wireless links 13 directly to UE 6, or to vehicle control unit 4. Vehicle control unit 4 may transmit, via link 8, the vehicle cryptographic information that FOBs 9 contain to UE 6 either as-stored in the FOBs, or as information that is derived from cryptographic information as-stored, or previously stored, in the FOBs.

Figure 3:
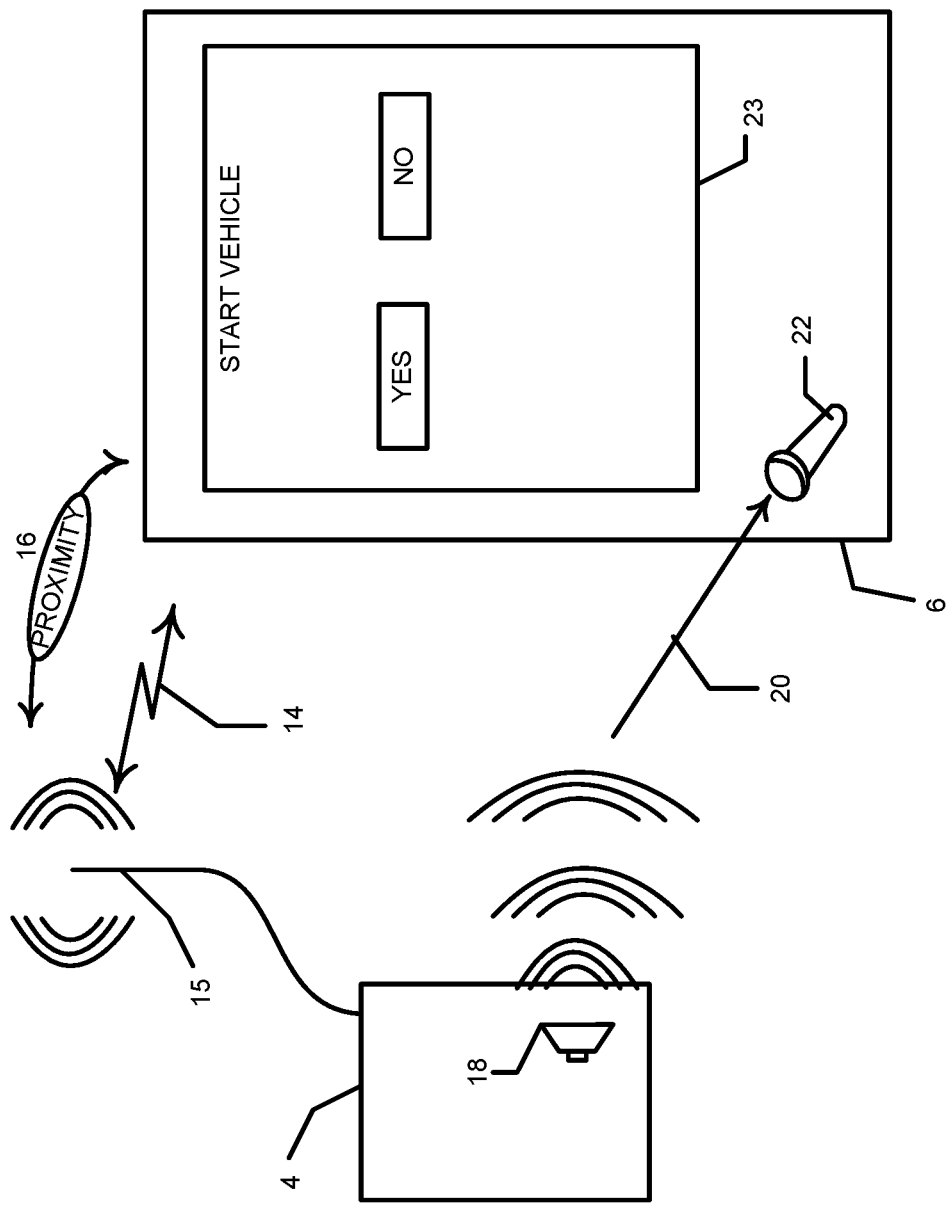
FIG. 3 illustrates a UE connected via a wireless data link to a vehicle control unit.

Turning now to FIG. 3, data link 14 is shown between UE 6 and vehicle control unit 4. Data link 14 may have been established in response to a trigger at one or the other, or both, of UE 6 or control unit 4. A trigger may be a presence signal, or presence message included in a signal, that either UE 6 or control unit 4 detects when coming within a predetermined vehicle-remote-control-range of the other device. A remote control range via a short range wireless link, which may be predetermined by vehicle control unit 4, may be inherently determined simply as a matter of whether a presence signal from either device 4 or device 6 can detect signals from the other device via the short range wireless link (typically based on strength of signal). Or, a remote control range may be determined based on signal strength such that the remote control range is less than the maximum range that the signal strength of a short-range wireless link 14 can physically support.

In an aspect, the ECU, or the TCU, may determine that a UE is within, or very close to, the cabin of the vehicle, by evaluating a signal strength of a short range wireless signal of the UE. For example, an ECU or TCU may approximate the distance to a UE by evaluating the signal strength of a Bluetooth Low Energy ("BTLE") proximity signal transmitted by the UE and received by the ECU, or TCU, (e.g., an ECU may evaluate a Received Signal Strength Indicator value, which may be referred to as "RSSI"). The BTLE proximity signal, which may be referred to as a beacon and which typically includes a universally unique identifier ("UUID"), may be used to determine the distance to the UE which transmitted the beacon, and if evaluation of the beacon indicates that the UE device that transmitted it is within a predetermined cabin distance, for example within three feet of the ECU or TCU that is performing the evaluation, then the ECU or TCU may determine that the UE is within the cabin of the vehicle.

In an aspect, to improve an approximation that may be generated by evaluating the RSSI of a UE's BTLE beacon/proximity signal, a refined-calibration distance may be determined based on the RSSI of the received beacon signal and based on a previously performed in-situ calibration method performed in or near the vehicle, or near the machine device to be operated, preferably during a pairing process where cryptographic information is exchanged between the UE and ECU, or TCU, of the vehicle. Determining the distance to a UE based solely on an RSSI value contained in a BTLE beacon signal may provide accuracy to within six meters. To improve this accuracy, a user's UE that is present in a vehicle at a predetermined location during an initial pairing can be used to correlate, or calibrate, or otherwise associate, an actual transmit location of a UE with the RSSI that it generates when at the actual transmit location. The in situ calibration method may include the step of a user holding his, or her, UE in their right hand between their face and the vehicle's steering wheel while pressing the brake pedal with their foot. (Pressing the brake pedal or operation of a different vehicle operational components may be configured in the ECU or TCU as a trigger event that precedes generation of a vehicle operational request message or that precedes generation of an 'activate microphone' message signal as discussed elsewhere herein.) While simultaneously receiving an RSSI from the UE and an indication of operation of a vehicle component, such as from a brake pedal, (such indication may occur when contacts of a brake light indicator switch 'make up' upon movement of the brake pedal from an unapplied position to a brake-applied position) during a pairing method, the ECU or TCU of the vehicle can create an association between the RSSI value and the location of the UE at the time the brake pedal was depressed by the user. Thus, in the future when the brake pedal is depressed while receiving an RSSI signal from a UE, the ECU or TCU can determine whether to generate a vehicle operational request message signal based on whether the RSSI value is within a tolerance that corresponds to a much closer range than six meters, for example one-half of a meter. This, aspect provides assurance that a UE device that may respond to a vehicle request message is actually inside the cabin of the vehicle.

Upon detection of a trigger signal, for example the UE detects the presence of vehicle control unit 4 by detecting a Bluetooth signal/beacon emanating from the vehicle control unit 4, the UE may request, via a data packet carried by the Bluetooth signal, that the vehicle control unit cause a speaker 18 (typically a speaker built into a cockpit of the vehicle device 4 is part of, or perhaps a speaker of an aftermarket device that is plugged into a diagnostic port of the vehicle, attached to a visor of the vehicle, or that is part of another device that is associated with the vehicle) to emit a vehicle operational (i.e., 'start') tone signal 20. Tone signal 20 may be a vehicle operation request message signal and may include cryptographic seed information, or other cryptographic input information, intended to be processed by UE 6. (If the vehicle operational request message includes cryptographic key information shared during paring of the vehicle device 4 and UE 6 only UE 6 may be able to successfully calculate a correct cryptographic result such that the control unit recognizes commands received from the UE as authentic command messages that may cause control unit 4 to cause operational changes of the vehicle (e.g., starting a vehicle's engine, or otherwise permitting a vehicle's motivational component, such as an electric motor, to cause motion of the vehicle). UE 6 receives the vehicle operational request tone signal with microphone 22. The vehicle operational request message may be generated and broadcast from speaker 18 as an ultrasonic signal, for example as a frequency shift keying ("FSK") signal, phase shift keying ("PSK") signal, discrete multitone ("DMT") or the like, and may include cryptographic information such as, for example, a one-time-value (i.e., a value generated by the vehicle device for use by a receiving device one time, which may be referred to as 'NONCE') for potential use by a receiving device. The cryptographic information may be information that may be used as an input to a cryptographic algorithm, which cryptographic input information may include one or more of: a NONCE, a time value, location coordinate/information, a generated random value, a generated pseudo random value (e.g., a value that may be used more than one time, but that is substantially random and substantially unique with respect to cryptographic input information that may have been generated for use with a previous vehicle operational request message), a seed, or the like. The cryptographic input information may be generated at least partially based on cryptographic information, such as keys, that may have been shared during an initial pairing of UE 6 and vehicle device 4. An advantage of transmitting the vehicle operational request message as an ultrasonic tone signal eliminates noise that may be annoying and possibly uncomfortable to a user attempting to start vehicle 2. The operational request message may, of course, be transmitted in the normal range of audio that is detectable to humans.

Another advantage of transmitting the vehicle operational request message as an ultrasonic tone signal ensures that an authorization message received in response to the operational request message was generated by a UE device that necessarily was within the ultrasonic tone range of the speakers of vehicle 2 that transmitted the operational request message. Typically, the audio system and speakers of vehicle 2 will transmit the operational request message at a power level such that the ultrasonic operational request message signal will be practically undetectable by a UE microphone unless the UE is located within the cabin of the vehicle, or very close to the vehicle which may have the windows open or a door open.

In an aspect, instead of UE 6 detecting the presence of a BTLE beacon being a trigger, vehicle device 4 (i.e., ECU or TCU) of the vehicle may detect the presence of a UE beacon. In addition to, or instead of, detecting the UE beacon, vehicle device 4 may also determine a trigger event as occurring when a user has operated a vehicle operational component, for example by depressing the brake pedal as discussed above, by operating a door open mechanism such as a handle or button, by operating a door lock mechanism, or by pressing a 'Start' button of the vehicle. The term vehicle operational component may encompass other components than the ones just listed. Upon evaluating an RSSI of UE 6 as discussed above, or upon detecting of a different trigger event occurrence such as operation of a vehicle operational component (i.e., pressing Start or pressing the brake pedal), the vehicle's ECU or TCU may cause the transmission of a 'activate microphone' message signal via a short range wireless link, which link may be Bluetooth, BTLE, Wi-Fi, or the like. UE may 'turn on' its microphone upon receiving the 'activate microphone' message. Upon receiving an acknowledgment that UE 6 received the activate microphone message signal via Bluetooth or similar short range wireless link, vehicle device 4 generates and transmits a vehicle operational request message signal via an audio signal that may include, at least partially, ultrasonic tones, or ultrasonic tone components, that are inaudible to human hearing. A vehicle operational request message may compose, instead of or in addition to an audio signal, a visible manifestation, such as a QR code or a bar code. The vehicle operational message included in the vehicle operational request message signal may include a NONCE value, which may be a 32 bit value, or other bit-length. An operational request message may include, instead of a NONCE, or in addition to a NONCE, other cryptographic input information as discussed above. After UE 6 receives the vehicle operational request message signal via its microphone, the UE may turn off its microphone to preclude receiving an imposter vehicle request message signal. UE 6 may perform or evaluates a cryptographic calculation based on the cryptographic input information value received in the vehicle operational request message and transmits a result of the cryptographic calculation in a vehicle operation permission message signal for use by vehicle device 4 in performing one or more operations permitted by the vehicle operation permission message.

Alternatively, an activate-microphone message may be received via a long range wireless link from a wireless network operator's network in response to a message from a TOS that may have evaluated location information of the UE and determined that the UE is close to the vehicle. Upon receiving the activate microphone message, the UE may turn on its microphone 22 and receive vehicle operational/start tone signal 20 as discussed above. As described above, vehicle start signal 20 may include NONCE or other cryptographic input information. The cryptographic input information received in audio signal 20 may be different than cryptographic information that may be included in a beacon transmitted by the vehicle control unit 4. The UE may use both the cryptographic input information contained in the audio signal 20 and cryptographic information contained in the beacon from control unit 4 to generate a vehicle operation permission message and broadcast it as a vehicle operation permission message signal via short range wireless link for use by the vehicle control unit to perform an operation requested in the vehicle operational request message. The cryptographic input information may include a value associated with, corresponding to, or indicative of, an operation being requested in the vehicle operational request message. With respect to a vehicle operational request message signal, the signal may be generated, and/or transmitted by an audio modem that is part of vehicle 2 and that is coupled with a communication bus of the vehicle. Or, the audio modem may be plugged into a port of the vehicle, such as an OBD-II port, or similar diagnostics port, of the vehicle. Instead of an ultrasonic tone, or signal, the vehicle operational request signal may be transmitted by an audio modem at a frequency that is within a typical human's hearing frequency range.

Upon receiving operational request message signal 20 via microphone 22, UE 6 may prompt a user to confirm an operation of the vehicle—for example, display 23 may provide an interface that permits a user to select 'Yes' or 'No' in response to a query whether to start the vehicle associated with control unit 4. If a user selects No, a message may be transmitted back to control unit 4 via link 14 that the vehicle is not to be started. Or, if a response, either Yes or No, is not received within a predetermined start-query-response period, a message may also be returned to control unit 4 via link 14 that the vehicle is not to be started.

If, however, a user selects 'Yes' from the interface provided in display 23, UE 6 may generate a vehicle operation permission message, such as a start-vehicle message. The vehicle operation permission message may include derivative cryptographic information that is at least based on the cryptographic input information (e.g., a one-time NONCE value) generated by control unit 4 and that was included in the vehicle operational request message sent from the control unit. In addition to the cryptographic input information received via microphone 22 in the vehicle operational request message, the derived cryptographic information may also be based on the cryptographic information that was stored into UE 6 during pairing process 12 shown in FIG. 2. The cryptographic input may also be based on an operation being requested in the operational request message. For example, a value, or code, that corresponds to vehicle start may be included in a cryptographic input value sent via speaker 22. Deriving the cryptographic information to include in the vehicle operation permission message may include performing a hash operation on information that includes the cryptographic input received from control unit 4 in the vehicle operational request message signal. After generating the vehicle operation permission message, UE 6 transmits it as a vehicle operation permission message signal, either via conventional short-range wireless link, or the UE may transmit the vehicle operation permission message signal via its speaker so that a vehicle microphone must receive the vehicle operation permission message signal for a control unit of the vehicle to be able to process the vehicle operation permission message.

If UE 6 uses a speaker to transmit the vehicle operation permission message signal, the UE may modulate it as an ultrasonic tone before transmitting it, preferably at a power level that precludes transmission of the vehicle operation permission message signal substantially beyond the confines of cabin 7. As with the vehicle operational request message, the ultrasonic vehicle operation permission signal may be transmitted by an audio modem (or generated thereby for transmission by a discrete speaker component if the audio modem does not include a speaker) at one or more ultrasonic frequencies. This adds an added level of insurance that the vehicle operation permission message signal is received from a UE that is located with vehicle 2, presumably by an authorized user of the vehicle, instead of possibly from a UE that could be thirty meters away.

Figure 4:
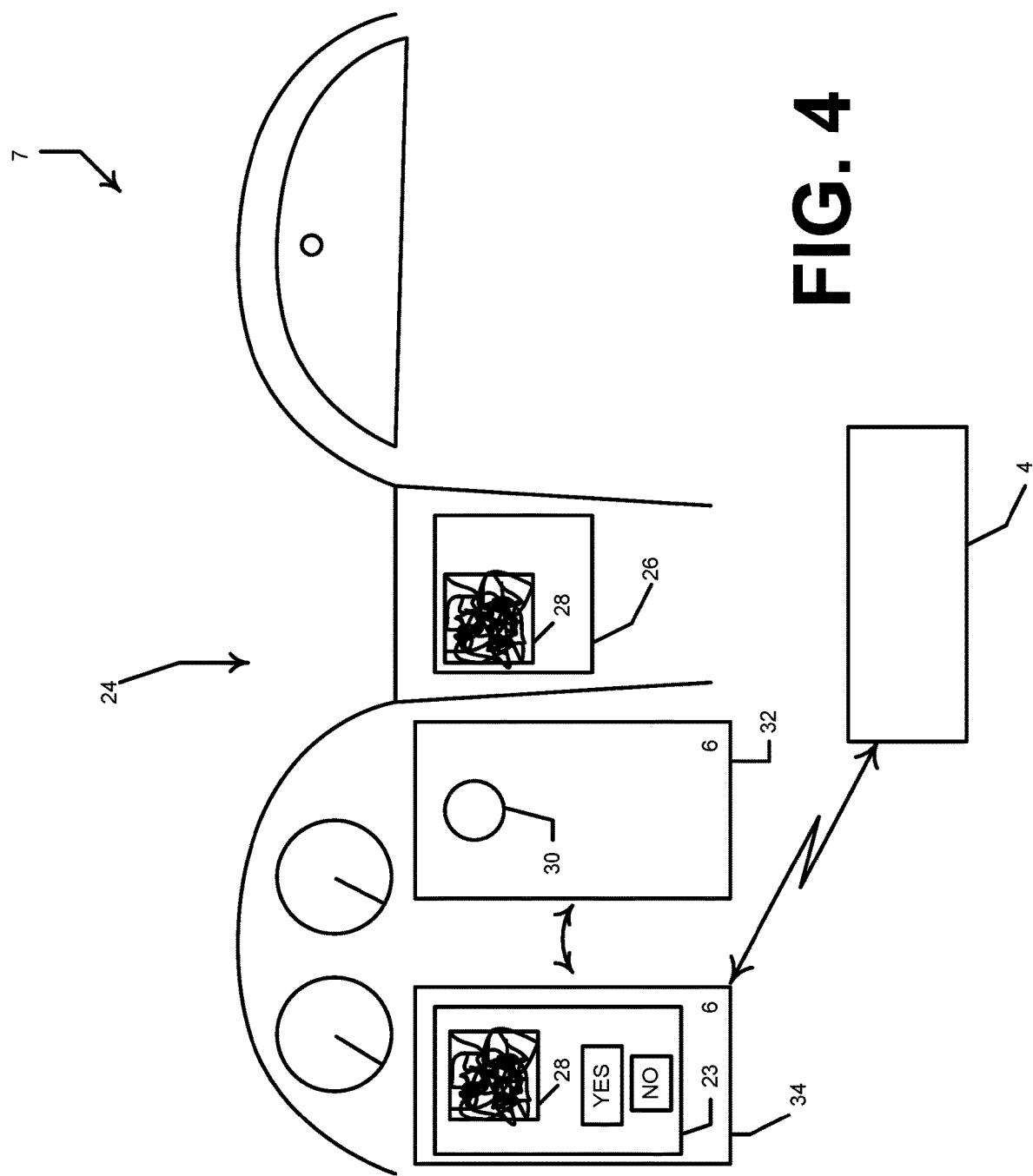
FIG. 4 illustrates an aspect for providing a vehicle operational request message to a UE via a QR code.

Turning now to FIG. 4, the figure illustrates an alternative aspect for providing a vehicle operational request message to a UE instead of by transmitting as a FSK, PSK or DMT signal from a speaker. Dashboard 24 of cockpit 7 may include a display 26 for displaying video, picture, or text content, that may be part of a vehicle infotainment system, a vehicle navigation system, a vehicle operational condition status system (for example gauges and operational parameter indicators that are rendered on a display instead of discrete analogue gauges or discrete alphanumeric readout displays), or that may be a detachable UE that may be configured for use with a vehicle, but not configured for generating a vehicle operation permission message that can permit operation of the vehicle with which it is associated.

Instead of generating an FSK vehicle operational request message signal and broadcasting it as an ultrasonic tone, or tones, from a speaker, at a power level that is intended only to reach a UE that is inside, or outside but very near, cockpit 7, control unit 4 may send signaling containing a message, or information, that causes display 26 to display a QR code 28, a bar code, or other similar means for conveying digital information in an image. Camera 30 on a backside 32 of UE 6 may capture QR code 28 and display it on display 23 on a front side of the UE. Display 23 may provide a user interface that provides an option for a user to confirm that the UE should process the vehicle operation request message and information contained in QR code 28, by selecting Yes at the bottom of the user interface. Or, if the user does not wish to start the vehicle, or does not desire that the vehicle perform another one or more operations that the vehicle operational request message may be requesting, a user may select No at the bottom of the user interface displayed in display 23.

If the user selects Yes at the bottom of display 23, UE 6 may generate a vehicle operation permission message based on a key/session value, or other cryptographic input information included in QR code 28, or based on cryptographic information that was stored into the UE when it was paired with control unit 4 during pairing process 22 as shown in FIG. 2. When UE 6 generates an operation permission message, the UE may transmit the operation permission message to control unit 4 via data link 14, or via an ultrasonic vehicle operation permission message signal as described above. Upon receiving a vehicle operation permission message from a UE with which it has been previously paired, and that contains cryptographic information that authenticates the UE with the control unit, control unit 4 causes the performance of the operation (or multiple operations) that the vehicle operational request message contained. If a given vehicle operational request message included a plurality of operational requests corresponding to a plurality of respective vehicle operations, for example, start the vehicle, start the air conditioning system, and roll down the windows, a user may be able to select, via user interface 23, that he, or she, desires some, but not all, of the requested operations, by selecting Yes for the desired operations and No for the operations that he, or she, wishes to decline.

Turning now to FIG. 5, a flow diagram illustrates steps of a method 500 for granting permission to perform one, or more vehicle operations. Method 500 begins at step 505. At step 510 a vehicle control unit pairs with a user's UE device. The pairing may occur according to a protocol such as Bluetooth, Bluetooth Low Energy, or other similar short-range wireless protocol for connecting devices wirelessly. Pairing at step 510 may include the transferring of vehicle cryptographic information stored in one or more FOBs that are already associated with a vehicle corresponding to the vehicle control unit.

After pairing has occurred between the vehicle control unit and the UE, one or the other of the control unit or the UE may detect the presence of the other device at step 515. For example, when a user opens a door to his, or her, vehicle, one or the other of the vehicle control unit or the user's UE may detect a wireless signal of the other (e.g., the user's UE device detects, or discovers, the presence of the vehicle's Bluetooth friendly name in a signal being broadcast by a control unit of the vehicle).

If a vehicle operation permission message signal has not been received by a vehicle's control unit with a configurable absence period at step 517, the vehicle control unit may generate a vehicle operational request message signal at step 520. The vehicle control unit may have been programmed to automatically generate a vehicle operational request message upon discovering the presence of a UE after a predetermined absence period has occurred, during which period the vehicle has been off and during which period the UE has not been paired with the vehicle control unit. Including the unpaired state between the UE and vehicle control unit as a condition for generating a vehicle operational request message may facilitate a configurable scheduling procedure for generation of vehicle operation request message signal to accommodate different use scenarios. For example, if the vehicle control unit 4 determines that the vehicle is located at the user's home location, the vehicle has been turned off, and the user's UE has been unpaired for less than a five-minute predetermined absence, then instead of generating a vehicle operational request message and broadcasting a signal contained the vehicle operation request message, the vehicle control unit may authorize starting of the car in response to receiving a vehicle operation permission message signal from a user's smart phone that was paired with the vehicle control unit before the vehicle was turned off and before the unpaired absence period began. By using a configurable (i.e., changeable) absence period, which may be configured by a user using the smart phone that was paired at step 510, or alternatively which may only be configured wirelessly by a vehicle manufacturer or telematics services provider, any delay in generating a vehicle operational request message, transmitting it via ultrasonic tone, receiving it via a UE microphone and regenerating a vehicle operation permission in response thereto, which albeit is a small delay compared to a UE-to-wireless-mobile-network-to-vehicle-control-unit delay as discussed above, may be eliminated for scenarios where a vehicle user is away from his, or her, vehicle for a short period. For example, if a vehicle user returns home to retrieve an item from their home and dashes back to restart their vehicle within the preconfigured absence period, the UE could re-transmit the most recently transmitted vehicle operation permission message upon the user of the UE entering a granting of permission to perform the operation into an interface of his, or her, UE. If the user did not close the application for starting the vehicle after the most recent start-up procedure, the user may press start immediately upon re-entering the vehicle (or after coming within Bluetooth range of the vehicle) and the UE may transmit the vehicle operation permission message, in this case a vehicle start message, as soon as a short range wireless link has been reestablished with the vehicle control unit. In such a scenario, the user may use the same vehicle start application running on his, or her, UE that he, or she, used to start the vehicle previously, and the most recent vehicle operation permission message would be re-transmitted from the UE to the vehicle control unit. As long as the most recently received vehicle operation permission message is received by the vehicle control unit within the absence period, the vehicle control unit may presume at step 550 that the authorized user of the vehicle transmitted the most recently received vehicle operation permission message using the UE that was paired with the vehicle control unit at step 510.

However, if the vehicle control unit does not receive a vehicle operation permission message signal within the absence period, the vehicle control unit may generate a new vehicle operational request message and transmit it as a vehicle operational request message at step 520. The vehicle operational request message may include a request to start the vehicle associated with the vehicle control unit. At step 525 the vehicle control unit causes the transmitting of the vehicle operational request message directed to the UE that is paired with the vehicle control unit and that has been preset/preauthorized (typically during the pairing process that occurred at step 510) for granting permission in response to the vehicle operational request message signal.

An 'activate microphone' message may be generated and transmitted at either of steps 515 or 520 to instruct a UE device to activate its microphone, or other analogue transducer, to prepare to receive an operational request message.

The operational request message is preferably transmitted from an analog transducer, device, or component. The vehicle operation request message analog transmission may be facilitated, carried out by, performed by, or otherwise provided by, a speaker in the vehicle as an FSK, PSK or DMT message in ultrasonic signaling. The vehicle operational request message may be provided as a QR code, bar code, or the like, via a display in the vehicle. The vehicle operational request message may be provided as a digital code, using light either visible or invisible (i.e., infrared), via an emitter in the vehicle. The vehicle operational request message may be provided via a display associated with, that may be, or may not be, fixed to, or part of, the vehicle, wherein the device or component that transmits, renders, produces, or otherwise provides, the vehicle operational request message is not the UE that was paired with the vehicle control unit at step 510.

At step 530, the preauthorized UE detects and receives the vehicle operational request message and processes the vehicle operational request message and information contained therein at step 535. If the vehicle operational request message was transmitted from a speaker, the UE detects and receives the vehicle operational request message via a microphone. In an aspect, if the vehicle operational request message was provided as a QR code via a display associated with the vehicle corresponding to the vehicle control unit that caused the transmitting of the vehicle operational request message, the preauthorized UE may receive the vehicle operational request message from the display that is providing the QR code via a camera of the UE. The camera of the UE may also sense, or detect infrared signals. Accordingly, the operational request message, and operation permission message may be transmitted and received via infrared signals between the UE and a sensor of the vehicle, or vehicle control device.

If the UE determines, as a result of the processing at step 535 that the vehicle operational request message includes a request to perform a vehicle operation such as starting the vehicle, the UE processing the vehicle operational request message extracts cryptographic input information contained in the vehicle operational request message signal at step 540. The cryptographic input information contained in the vehicle operational request message received from the vehicle control unit may be a one-time key, or similar cryptographic information, that may be based on information stored into the vehicle control unit during the pairing process that occurred at, and that is unique to, the particular pairing process that occurred at step 510. The UE may also retrieve, from a memory of the UE, or from a memory device that is coupled with the UE, cryptographic information that is, or that is derived from, vehicle cryptographic information that may have been shared during pairing at step 510. Such vehicle-specific cryptographic information that was shared at step 510 may include cryptographic information stored in one or more key FOBs that were manipulated within proximity of the UE and the vehicle control unit during pairing at step 510.

After extracting/obtaining/retrieving the cryptographic input/vehicle cryptographic information contained in the vehicle operational request message or from a memory associated with the UE, the preauthorized UE generates at step 545 a vehicle operation permission message based on the vehicle cryptographic information contained in the vehicle operational request message or retrieved from the UE. The vehicle operational permission message may contain vehicle permission cryptographic information that is based on the vehicle cryptographic information that was contained in the vehicle operational request message or that is based on cryptographic information stored into the UE at step 510. At step 550, the preauthorized/pre-paired UE transmits the vehicle operation permission message at step 550, wherein the vehicle operation permission message includes the vehicle permission cryptographic information. At step 555, the vehicle control unit that transmitted that vehicle operational request message at step 525 receives and authenticates the vehicle operation permission message based on the vehicle permission cryptographic information contained therein, and causes the performance of the operation requested in the vehicle operational request message if the authentication process confirms that that the received vehicle operation permission message was generated by the preauthorized/pre-paired UE that was paired with the vehicle control unit at step 510. Method 500 ends at step 560.

What is claimed is:

1. A method performed by a wireless user device, comprising:
   wirelessly receiving a vehicle operational request message signal generated by a computer device of a vehicle;
   processing the vehicle operational request message signal;
   determining from the processing of the vehicle operational request message signal that the vehicle operational request message signal includes a request to operate the vehicle;
   extracting cryptographic input information from the vehicle operational request message signal;
   generating a vehicle operation permission message based on the cryptographic input information; and
   transmitting the vehicle operation permission message as a vehicle operation permission signal; and
   wherein the vehicle operational request message signal is a wireless audio signal, and wherein the wireless audio signal is received from the vehicle via a microphone of the user device.

2. The method of claim 1 wherein the computer device of the vehicle generates the vehicle operational request message signal based on detection of a trigger event.

3. The method of claim 2 wherein the trigger event includes the generation of a proximity signal by a user device.

4. The method of claim 1 wherein the wireless user device is a smart phone.

5. The method of claim 1 wherein the audio signal includes tone components within an ultrasonic range.

6. The method of claim 1 wherein the cryptographic input information is based at least in part on secret information shared between a user device and the computer device of the vehicle during a wireless protocol pairing operation that occurred before the steps of claim 1 are performed.

7. The method of claim 6 wherein the wireless protocol is Bluetooth Low Energy.

8. The method of claim 1 wherein the vehicle operational request message signal includes a quick response code image.

9. The method of claim 1 wherein the cryptographic input information includes cryptographic information associated with one or more vehicle operational devices.

10. The method of claim 2 wherein the trigger event is the manipulation of a vehicle operational component.

11. The method of claim 1 further comprising receiving a signal that includes an activate microphone message that includes instructions to activate a microphone for receiving the vehicle operational signal.

12. A method, comprising:
   generating a vehicle operational request message with a computer device of a vehicle in response to a trigger event;
   wirelessly transmitting the vehicle operational request message as a vehicle operational request message signal;
   receiving a vehicle operation permission message that was generated based at least in part on vehicle cryptographic information shared during a pairing between the computer device of the vehicle with a user equipment device and a one-time value transmitted in the vehicle operational request message,
   determining that the received vehicle operation permission message was generated based at least in part on vehicle cryptographic information shared during the pairing of the vehicle computer device with the user equipment device; and generating an instruction to perform a vehicle operation included in the received vehicle operation permission message; and wherein the vehicle operational request message signal is at least partially transmitted as a wireless audio signal, and wherein the wireless audio signal is transmitted from the vehicle via a speaker.

13. The method of claim 12 wherein the audio signal includes tone components at least partially within an ultrasonic range.

14. The method of claim 12 wherein the vehicle operational request message is at least partially displayed as a quick response code image.

15. The method of claim 12 wherein the vehicle operational request message signal is transmitted at least partially as an infrared signal.

16. A method, comprising:

receiving a vehicle operation permission message directly from a user equipment device, determining that the received vehicle operation permission message was generated based at least in part on vehicle cryptographic information shared during a pairing of a vehicle computer device with the user equipment device;

determining that the received vehicle operation permission message is the same as a previously received vehicle operation permission message;

determining that the received vehicle operation permission message that is the same as the previously received vehicle operation permission message was received within an absence period; and generating an instruction to perform a vehicle operation included in the received vehicle operation permission message.

17. The method of claim 16 wherein the absence period is configurable by a user interface of a user equipment device, which was paired with the vehicle computer device before the previously received vehicle operation permission message was received.

18. The method of claim 16 wherein the vehicle cryptographic information includes vehicle cryptographic information transmitted from one or more vehicle operational devices during the pairing of the vehicle computer device with the user equipment device.

19. The method of claim 18 wherein one of the one or more vehicle operational devices is an electronic key fob.

* * * * *